(12) United States Patent
Zhou et al.

(10) Patent No.: US 12,083,783 B2
(45) Date of Patent: Sep. 10, 2024

(54) LOW TVOC RELEASE SILICONE COMPOSITE SHEET

(71) Applicant: ELKEM SILICONES SHANGHAI CO., LTD., Shanghai (CN)

(72) Inventors: Wenjuan Zhou, Shanghai (CN); Yin Zhang, Shanghai (CN)

(73) Assignee: ELKEM SILICONES SHANGHAI CO., LTD., Shanghai (CN)

( * ) Notice: Subject to any disclaimer, the term of this patent is extended or adjusted under 35 U.S.C. 154(b) by 697 days.

(21) Appl. No.: 16/957,999

(22) PCT Filed: Dec. 26, 2018

(86) PCT No.: PCT/CN2018/123975
§ 371 (c)(1),
(2) Date: Jun. 25, 2020

(87) PCT Pub. No.: WO2019/129087
PCT Pub. Date: Jul. 4, 2019

(65) Prior Publication Data
US 2020/0361180 A1 Nov. 19, 2020

(30) Foreign Application Priority Data
Dec. 28, 2017 (WO) ................ PCT/CN2017/119494

(51) Int. Cl.
| | |
|---|---|
| B32B 7/12 | (2006.01) |
| B32B 7/06 | (2019.01) |
| B32B 9/02 | (2006.01) |
| B32B 25/20 | (2006.01) |
| B32B 27/12 | (2006.01) |
| B32B 27/18 | (2006.01) |
| C08G 77/00 | (2006.01) |
| C08G 77/12 | (2006.01) |
| C08G 77/20 | (2006.01) |
| C08K 5/5425 | (2006.01) |
| C09J 183/04 | (2006.01) |

(52) U.S. Cl.
CPC .............. *B32B 7/06* (2013.01); *B32B 7/12* (2013.01); *B32B 9/025* (2013.01); *B32B 25/20* (2013.01); *B32B 27/12* (2013.01); *B32B 27/18* (2013.01); *C08G 77/12* (2013.01); *C08G 77/20* (2013.01); *C08G 77/70* (2013.01); *C08K 5/5425* (2013.01); *C09J 183/04* (2013.01)

(58) Field of Classification Search
CPC .......... B32B 7/12; B32B 9/025; B32B 25/20; B32B 27/12; B32B 27/18; C08G 77/70; C09J 183/04; B60R 21/16
See application file for complete search history.

(56) References Cited

U.S. PATENT DOCUMENTS

| | | | |
|---|---|---|---|
| 3,159,601 A | 12/1964 | Ashby | |
| 3,159,602 A | 12/1964 | Hamilton et al. | |
| 3,220,972 A | 11/1965 | Lamoreaux | |
| 3,377,432 A | 4/1968 | Abbott et al. | |
| 3,419,593 A | 12/1968 | Willing | |
| 3,715,334 A | 2/1973 | Karstedt | |
| 3,814,730 A | 6/1974 | Karstedt | |
| 5,700,532 A * | 12/1997 | Chiou | B60R 21/235 428/36.1 |
| 5,932,060 A | 8/1999 | O'Brien | |
| 2005/0282453 A1 | 12/2005 | Jackson et al. | |
| 2014/0039106 A1* | 2/2014 | Tasaki | C08K 5/09 524/300 |
| 2015/0267344 A1* | 9/2015 | Blackwood | B60R 21/235 428/221 |
| 2016/0325705 A1* | 11/2016 | Zhou | B32B 5/02 |
| 2018/0355552 A1 | 12/2018 | Hung et al. | |

FOREIGN PATENT DOCUMENTS

| | | |
|---|---|---|
| CN | 1968805 A | 5/2007 |
| CN | 101376792 A | 3/2009 |
| CN | 101443512 A | 5/2009 |
| CN | 101535429 A | 9/2009 |
| CN | 104768743 A | 7/2015 |
| CN | 105696361 A | 6/2016 |
| CN | 105934336 A | 9/2016 |

(Continued)

OTHER PUBLICATIONS

PCT International Search Report for PCT/CN2018/123975, dated Mar. 22, 2019.

*Primary Examiner* — Joanna Pleszczynska
(74) *Attorney, Agent, or Firm* — McBee Moore & Vanik, IP, LLC

(57) ABSTRACT

The disclosure relates to a low TVOC release silicone composite sheet, comprising: 1) a substrate layer selected from a fabric or a polymeric film. 2) a silicone adhesive layer coated onto the substrate layer and containing volatile organic compound (VOC) releasing additives, and 3) a reinforcing layer adjacent to the silicone adhesive layer; wherein the coating amount of the silicone adhesive layer is less than 45 wt %, preferably less than 35 wt %, more preferably less than 20 wt %, based on the total coating amount of the silicone adhesive layer and the reinforcing layer. and wherein both silicone adhesive layer and reinforcing layer contain or consist essentially of liquid silicone rubber (LSR) or room temperature vulcanized silicone rubber (RTV), and said reinforcing layer contains one or more coatings comprising A). organopolysiloxane having one or more silicon atom-bonded alkenyl groups on average in one molecule; B). an organohydrogenpolysiloxane; and C). a hydrosilylation reaction catalyst present in any amount effective to cure the composition. Furthermore, it relates also to a method for coating and for reducing TVOC release.

15 Claims, No Drawings

(56) References Cited

FOREIGN PATENT DOCUMENTS

| | | |
|---|---|---|
| EP | 0057459 A1 | 8/1982 |
| EP | 0188978 A1 | 7/1986 |
| EP | 0190530 A1 | 8/1986 |
| EP | 0866164 A1 | 9/1998 |
| EP | 0903388 A2 | 3/1999 |
| EP | 3231606 A1 | 10/2017 |
| JP | 03106977 A | 5/1991 |
| JP | 0439036 A | 2/1992 |
| JP | 2004039036 A | 2/2004 |
| JP | 3808279 B2 | 8/2006 |
| JP | 2001293786 A | 8/2006 |
| JP | 2008503655 A | 2/2008 |
| JP | 2011001876 A | 1/2011 |
| KR | 19980080389 A | 11/1998 |
| KR | 20070024610 A | 3/2007 |
| WO | 2006007404 A2 | 1/2006 |
| WO | 2016093281 A1 | 6/2016 |
| WO | 2016207498 A1 | 12/2016 |

\* cited by examiner

US 12,083,783 B2

LOW TVOC RELEASE SILICONE COMPOSITE SHEET

CROSS-REFERENCE TO RELATED APPLICATIONS

This application is the National Stage entry of International Application No. PCT/CN2018/123975, filed 26 Dec. 2018, which claims priority to China No. PCT/CN2017/119494, filed 28 Dec. 2017.

BACKGROUND

Field

Technical Field

The disclosure relates to a low TVOC release silicone composite sheet, a method for coating and use of the method for reducing TVOC release.

Description of Related Art

Because of the environmental damage that can be caused from VOC (volatile organic compounds), there are various regulations that limit the use of coatings with high VOC release.

Higher standard on TVOC (total volatile organic compounds) release for total car modulus is required. Especially, the coated fabric for air bag with high coat weight like 100 gsm to 200 gsm is highlighted to pass the level of less than 50 ugC/g. The high weight coated fabric is mainly used for heat resistant sheet. Most of the existing coating products cannot reach this industry standard.

CN 104768743 A discloses an inflatable vehicle safety device including e.g. air bag in which a barrier layer may be adjacent to the fabric layer and includes at least one layer of silicone elastomer and one or more topcoats. This reference focuses on the heat resistance but fails to pay attention to reduce VOC release.

Besides, for abrasion resistant artificial leather coated with silicone composition, TVOC also becomes a difficult topic. Currently, the skilled persons have not found efficient method to reduce the TVOC level to about 100 ugC/g or less.

One feasible method in the prior art to reduce the VOC release amount may probably be baking which requires however longer curing time and/or higher curing temperature. Even if subjected to such a baking or curing treatment, the composite sheet may probably be still not compliant with the strict regulations on VOC release. In case of high coat weight coating, the situation is worse since more VOC-releasing additives are contained in the adhesive layers.

An efficient method to reduce TVOC release is urgently required to satisfy the new standard and strict regulations, especially in case of high coat weight coating.

SUMMARY

It is an object of the present disclosure, therefore, to provide a composite sheet which releases lower TVOC but still maintaining good adhesion to the substrate and thus good mechanical property. This object, surprisingly, is achieved with the composite sheet as described in claim 1.

Another object is to provide a method of coating during which lower TVOC is released and the adhesion is not impaired. With this method, harsher curing or baking conditions are not required any more to reduce TVOC release. This object can be also achieved by the method as described in claim 15.

Definitions

As used herein, the term "low TVOC composition" means that the composition contains no more than 100 ugC/g of total volatile organic compounds per gram of the cured coating composition.

As used herein, the term "volatile organic compound" refers to compounds that have at least one carbon atom and which are released from the cured composition. Examples of "volatile organic compounds" include, but are not limited to, alcohols, benzenes, toluenes, chloroforms, and cyclohexanes. In particular in the fabric for preparing airbags or artificial leather products which are to be coated with silicone composition, the VOC mainly comes from alcohol from silane, volatiles in the silicone oils, silicone resin etc.

As used herein, the term "high coat weight coating" means that the weight of the coating composition on the unit area after curing or after drying per unit area not less than 90 gram square meter, preferably 100 gsm-400 gsm.

As used herein, when referring to a composition or component, such as the organopolysiloxane or a polysiloxane resin, the term "consisting (or consists) essentially of" means that the concerned component or composition comprises more than 50% by weight, for example, at least 60% by weight, at least 70% by weight, or at least 80%, 90% or 95% by weight, or even 100% by weight of the indicated ingredient or component respectively, based on the total weight of the concerned component or composition respectively.

In a first aspect of the present disclosure, a composite sheet is provided, comprising:
  1) a substrate layer selected from a fabric or a polymeric film.
  2) a silicone adhesive layer coated onto the substrate layer and containing volatile organic compound (VOC) releasing additives, and
  3) a reinforcing layer adjacent to the silicone adhesive layer;
  wherein the coating amount of the silicone adhesive layer is less than 45 wt %, preferably less than 35 wt %, more preferably less than 20 wt %, based on the total coating amount of the silicone adhesive layer and the reinforcing layer.
  and wherein both silicone adhesive layer and reinforcing layer contain or consist essentially of liquid silicone rubber (LSR) or room temperature vulcanized silicone rubber (RTV), and
  said reinforcing layer contains one or more coatings comprising
  A). organopolysiloxane having one or more silicon atom-bonded alkenyl groups on average in one molecule;
  B). an organohydrogenpolysiloxane; and
  C). a hydrosilylation reaction catalyst present in any amount effective to cure the composition.

DETAILED DESCRIPTION OF A PREFERRED EMBODIMENT

In the prior art, the material compositions of the silicone adhesive layer and the reinforcing layer as defined in the context of this disclosure are usually simply and homogeneously mixed by the skilled person to form an adhesive layer coated on the substrate like airbags or artificial leathers. Then they are baked or cured at a relatively high temperature within a long time to release as much VOC as possible. However, the inventor has unexpectedly found that the amount of released TVOC can be notably reduced without harsh curing and baking conditions while still maintaining good mechanical property like cohesive strength, provided that the usual adhesive coating is designed as a two-layer structure as defined above and the VOC-releasing additives are contained in the silicone adhesive layer and its coating amount is less than 45 wt % as required above. The TVOC release will be reduced to less than 100 μgC/g, preferably less than 70 μgC/g, more preferably less than 50 μgC/g.

In the present disclosure, the substrate layer can be a fabric including a woven fabric or a nonwoven fabric, or a polymeric film selected from polypropylene, polyethylene, fiberglass, polyamides, poly(ethylene) terephthalate, and compositions or mixtures thereof. The woven fabric may have threads with a thickness that is advantageously equal to or greater than 20 dtex. When the fabric is a nonwoven fabric, it may have a basis weight between about 40 g/m² and about 400 g/m². When the nonwoven fabric is used as the substrate layer, it is preferably an artificial leather.

In one embodiment of the disclosure, it has been found that the inventive method and composite sheet are most suitable for the substrate which is air bag or artificial leather or at least part of them. During the preparation of air bags or artificial leathers according to the present disclosure, much less TVOC would be released compared with the prior art under the same treatment conditions such as baking temperature and curing duration.

The silicone adhesive layer is a first layer directly applied on the substrate. In one beneficial embodiment, it contains or consists essentially of liquid silicone rubber (LSR) or room temperature vulcanized silicone rubber (RTV), including without limitation any base material.

In one embodiment, the silicone adhesive layer is a composition including:

A). organopolysiloxane having one or more silicon atom-bonded alkenyl groups on average in one molecule;

B). an organohydrogenpolysiloxane;

C). a hydrosilylation reaction catalyst present in any amount effective to cure the composition;

D). VOC-releasing additives.

Component A) Organopolysiloxane

In the present disclosure, the alkenyl group in the organopolysiloxane may be at any position on the main chain of the polysiloxane, for example at the end or in the middle or at both ends and in the middle of the molecular chain.

In one beneficial embodiment of the disclosure, the organopolysiloxane comprises:

(i) siloxane units of formula (I-1)

wherein $R^1$ represents $C_2$-$C_{12}$, preferably $C_2$-$C_6$ alkenyl, most preferably vinyl or allyl, Z may be the same or different and represent a monovalent hydrocarbon radical having from 1 to 30, preferably from 1 to 12 carbon atoms, including alkyl groups optionally substituted by at least one halogen atom, preferably selected from $C_1$ to $C_8$ alkyl groups, and also including aryl groups, especially $C_6$ to $C_{20}$ aryl groups, a is 1 or 2, b is 0, 1 or 2 and the sum of a+b is 1, 2 or 3, and (ii) optionally other siloxane units of formula (I-2)

wherein

Z has the meaning as described above and c is 0, 1, 2 or 3.

In a preferred embodiment, Z may be selected from the group consisting of methyl, ethyl, propyl, 3,3,3-trifluoropropyl, phenyl, xylyl and tolyl and the like. Preferably, at least 60 mol % of the group Z is methyl.

The organopolysiloxane may have a viscosity of at least equal to 50 mPa·s and preferably less than 200,000 mPa·s. In the present disclosure, all viscosity data are concerned with dynamic viscosity values and can be measured, for example, in a known manner at 20° C. using a Brookfield instrument, unless otherwise specified.

The organopolysiloxane may be formed only from the units of formula (I-1) or may additionally comprise units of formula (I-2). The organopolysiloxane may be a linear, branched or cyclic structure.

Examples of the siloxane units of formula (I-1) include vinyl dimethylsiloxy, vinylphenylmethylsiloxy, vinyl methylsiloxy and vinyl siloxane units.

Examples of the siloxane units of formula (I-2) include $SiO_{4/2}$ units, dimethylsiloxy, methylphenylsiloxy, diphenylsiloxy, methylsiloxy and phenylsiloxy units.

Examples of the organopolysiloxane include straight or cyclic compounds such as dimethylpolysiloxane (including dimethylvinylsilyl end group), (methylvinyl) (dimethyl) polysiloxane copolymers (including trimethylsilyl end group), (methylvinyl) (dimethyl) polysiloxane copolymers (including dimethylvinylsilyl end group) and cyclic methyl vinyl polysiloxane.

In one more preferable embodiment, especially low TVOC release with very stable adhesion to the substrate is found if the organopolysiloxane comprises at least two different siloxane units selected from the group consisting of siloxane units M of formula $R_3SiO_{1/2}$, siloxane units D of formula $R_2SiO_{2/2}$, siloxane units T of formula $RSiO_{3/2}$ and siloxane units Q of formula $SiO_{4/2}$, wherein R represents a monovalent hydrocarbon group having from 1 to 20 carbon atoms, and with the proviso that at least one of these siloxane units is the siloxane unit T or Q and at least one of the siloxane units M, D and T comprises an alkenyl group.

As for the organopolysiloxane comprising the siloxane units M ($M^{Vi}$ units) having alkenyl groups, it is possible to use a polysiloxane resin selected from the group consisting of the following organopolysiloxane resins (in the context, when mentioning the unit T, Q or D, the unit with the superscript "Vi" represents the unit containing alkenyl group):

an organopolysiloxane resin of formula $M^{Vi}Q$ consisting essentially of the following units:
monovalent siloxane units $M^{Vi}$ of formula $R'R_2SiO_{1/2}$, and
tetravalent siloxane units Q of formula $SiO_{4/2}$, and
an organopolysiloxane resin of formula $MM^{Vi}Q$ consisting essentially of the following units:
monovalent siloxane units M of formula $R_3SiO_{1/2}$, and
monovalent siloxane units $M^{Vi}$ of formula $R'R_2SiO_{1/2}$, and tetravalent siloxane units Q of formula $SiO_{4/2}$, and
an organopolysiloxane resin of formula $M^{Vi}T^{Vi}Q$ consisting essentially of the following units:
(a) monovalent siloxane units $M^{Vi}$ of formula $R'R_2SiO_{1/2}$,
(b) trivalent siloxane units $T^{Vi}$ of formula $R'SiO_{3/2}$, and
(c) tetravalent siloxane units Q of formula $SiO_{4/2}$,
an organopolysiloxane resin of formula $M^{Vi}TQ$ consisting essentially of the following units:
trivalent siloxane units T of formula $RSiO_{3/2}$;
monovalent siloxane units $M^{Vi}$ of formula $R'R_2SiO_{1/2}$, and
tetravalent siloxane unit Q of formula $SiO_{4/2}$, and
an organopolysiloxane resin of formula $M^{Vi}DQ$ consisting essentially of the following units:
divalent siloxane units D of formula $R_2SiO_{2/2}$;
monovalent siloxane units $M^{Vi}$ of formula $R'R_2SiO_{1/2}$, and
tetravalent siloxane units Q of formula $SiO_{4/2}$,
wherein R represents a monovalent hydrocarbon group having from 1 to 20 carbon atoms, preferably a monovalent aliphatic or aromatic hydrocarbon group having preferably from 1 to 12, more preferably from 1 to 8 carbon atoms, and
R' represents an alkenyl group, preferably an alkenyl group having from 2 to 12, more preferably from 2 to 6 carbon atoms, particularly vinyl or allyl, and most preferably vinyl.

As for the organopolysiloxane comprising the siloxane units D ($D^{Vi}$ units) having alkenyl groups, it is possible to use a polysiloxane resin selected from the group consisting of:
an organopolysiloxane resin of formula $MD^{Vi}Q$ consisting essentially of the following units:
divalent siloxane units M of formula $R_2SiO_{2/2}$;
monovalent siloxane units $D^{Vi}$ of formula $R'R_2SiO_{1/2}$, and
tetravalent siloxane units Q of formula $SiO_{4/2}$,
wherein R represents a monovalent hydrocarbon group having from 1 to 20 carbon atoms, preferably a monovalent aliphatic or aromatic hydrocarbon group having preferably from 1 to 12, more preferably from 1 to 8 carbon atoms, and
R' represents an alkenyl group, preferably an alkenyl group having from 2 to 12, more preferably from 2 to 6 carbon atoms, particularly vinyl or allyl, and most preferably vinyl.

Furthermore, the organopolysiloxane resin comprising the siloxane units D ($D^{Vi}$ units) having alkenyl groups may be also selected from organopolysiloxane resins of formula $MD^{Vi}TQ$.

In one most preferable embodiment, the organopolysiloxane may be selected from organopolysiloxane resins of formula $MM^{Vi}Q$ and/or formula $MD^{Vi}Q$.

Component B) Organohydrogensiloxane

The organohydrogensiloxane in the silicone composition functions as a curing agent, such that the silicon-bonded hydrogen atoms in the organohydrogensiloxane react with the alkenyl radicals of the organopolysiloxane. The silicon-bonded hydrogen atoms in the organohydrogensiloxane may also be used to generate hydrogen gas for foaming the composition when desirable. Organohydrogensiloxanes that may be used contain an average of at least one silicon-bonded hydrogen atoms in chain per molecule.

The organohydrogensiloxane can have a linear, cyclic, or branched structure, and can be a homopolymer, a copolymer, mixtures of two or more different homopolymers, mixtures of two or more different copolymers or mixtures of these types of polymers.

The amount of the organohydrogensiloxane used should be sufficient to provide the desired degree of crosslinking during cure. Generally, the proportion of the organohydrogensiloxane will be within the range of from about 2 to about 80 parts, and alternatively from about 3 to about 40 parts by weight per 100 parts by weight of the organopolysiloxane.

Component C) Hydrosilylation Reaction Catalyst

The hydrosilylation reaction catalyst may comprise a platinum group metal catalyst including any rhodium, ruthenium, palladium, osmium, iridium or platinum-containing catalysts known to one skilled in the art to facilitate hydrosilylation reactions. It is preferred to use compounds of platinum and rhodium. The complexes and organic products of platinum described, for example, in the U.S. Pat. Nos. 3,159,601, 3,159,602, 3,220,972, EP-A-0 057 459, EP-A-0 188 978 and EP-A-0 190 530, and in particular, the complexes of platinum with vinyl organosiloxane described, for example, in the U.S. Pat. Nos. 3,419,593, 3,715,334, 3,377, 432 and 3,814,730, can be used. These patents are hereby incorporated by reference in their entirety.

In one embodiment, the platinum-containing catalyst is a platinum catalyst. Suitable forms of a platinum catalyst include but are not limited to chloroplatinic acid, 1,3-diethenyl-1,1,2,2-tetramethyldisiloxane platinum complex, complexes of platinous halides or chloroplatinic acid with divinyldisiloxane and complexes formed by the reaction of chloroplatinic acid, divinyltetrahmethyldisiloxane and tetramethyldisiloxane.

The amount of the hydrosilylation catalyst used such as the platinum catalyst is generally ranging from 0.1 to 10000 ppm, preferably 1 to 1000 ppm and more preferably 5 to 500 ppm based on the weight of the organopolysiloxane.

Component D) VOC-Releasing Additives

According to our disclosure, it is preferable that most of or all of the VOC-releasing additives are merged in the adhesive layer and the rest or none of them are contained in the second layer, i.e. reinforcing layer. Herein, the expression "most of or all of the VOC-releasing additives" refers to at least 60%, or preferably at least 70% or 80% or 90% or 95% or more preferably 100% of the total amount of VOC-releasing additives (that are required in the silicone adhesive and reinforcing layers but finally releases less than 100 μgC/g of TVOC according to the present disclosure). The VOC-releasing additives may include flavor agent, color paste, adhesive promotor or mixture thereof. Furthermore, the VOC-releasing additives may also include some fillers treated with VOC-releasing substance. Among the VOC-releasing additives, the adhesive promotor is an important one which releases a notable amount of VOC.

In one embodiment of the disclosure, the VOC-releasing additives are adhesive promoters which may be consisting essentially of one or more members selected from the group comprising:
a vinyl-based silane or organosiloxane alone or partially hydrolyzed and also one of its reaction products;
a silane or organosiloxane functionalized by an epoxy functional group alone or partially hydrolyzed and also one of its reaction products;
a methacrylate-functional silane or organosiloxane alone or partially hydrolyzed and also one of its reaction products;
a silane or organosiloxane functionalized by an anhydride radical alone or partially hydrolyzed and also one of its reaction products; and
a butyl titanate type chelate.

In another embodiment of the disclosure, the adhesive promoter may be one or more selected from epoxy silane, alkoxy silane, acyloxy silane, aryloxy silane or oligomers thereof. They include, but are not limited to, 3-glycidoxypropyl trimethoxy silane, octyltriethoxysilane, vinyltriethoxysilane, vinyltrimethoxysilane, gamma-methacryloxypropyltrimethoxysilane, beta-(3,4-epoxycyclohexyl)-ethyltrimethoxysilane beta-(3,4-epoxycyclohexyl)-ethyltriethoxysilane and bis(trimethoxysilyl propyl) fumarate, alkoxy or aryloxy silicones such as trimethoxysilyl functional groups modified silicones. Furthermore, they also include silanols, oligosiloxanes containing one or more alkoxy silyl functional group, polysiloxanes containing alkoxysilyl functional group, one or more oligomeric siloxanes containing hydroxyl functional groups, polysiloxanes containing one or more aryloxy silyl functional group, cyclosiloxanes containing one or more alkoxy silyl functional group, cyclosiloxanes containing one or more hydroxyl groups, tetra-alkoxy silanes, vinyltrimethoxysilane, and mixtures thereof, and combinations thereof.

In one beneficial embodiment, the invention is found very effective to reduce TVOC if the VOC-releasing additives are or contain adhesive promotors which are preferably selected from a vinyl-based silane or organosiloxane alone or partially hydrolyzed and also one of its reaction products, and a silane or organosiloxane functionalized by an epoxy functional group alone or partially hydrolyzed and also one of its reaction products; and more preferably selected from epoxy silan, alkoxy silane, aryloxy silane or oligomers thereof; and most preferably selected from 3-glycidoxypropyl trimethoxy silane, octyltriethoxysilane, vinyltriethoxysilane, vinyltrimethoxysilane, gamma-methacryloxypropyltrimethoxysilane, beta-(3,4-epoxycyclohexyl)-ethyltrimethoxysilane and beta-(3,4-epoxycyclohexyl)-ethyltriethoxysilane.

In one embodiment, the amount of the VOC-releasing additives, preferably adhesive promotors are from 0.01 to 5 parts, preferably 1 to 3 parts by weight per 100 parts by weight of component A organopolysiloxane.

The silicone adhesive layer is set as an adherent medium between the reinforcing layer and the substrate, and its coat weight must be controlled at a relative low level so that the contribution to the total carbon release is very limited. In one embodiment, the coat weight of the silicone adhesive layer is of 5 gsm-200 gsm, such as 10-150 gsm.

According to the present disclosure, a reinforcing layer is arranged adjacent to the adhesive layer. The reinforcing layer may be consisting of one or more coatings which are preferably coatings of a silicon-based composition. Such a silicon-based composition may preferably also comprise component A') organopolysiloxane, component B') organohydrogensiloxane, and optional component C') a hydrosilylation reaction catalyst. Herein, the general descriptions and preferable embodiments given for the components A) to C) of the adhesive layer apply respectively to the components A') to C') of the reinforcing layer.

In the instant application, the reinforcing layer may contain a top coat, which is the outmost coating of the composite sheet and may be different from the other coatings in the reinforcing layer with regard to the composition. Thus the reinforcing layer can play the role as heat resistance, abrasion resistance or surface low coefficient friction. Preferably, the reinforcing layer here including the outmost top coat (if present) is a silicone composition and thus is capable of forming a silicone coat upon curing.

In one preferable embodiment, the reinforcing layer may have the same or different composition as the adhesive layer does except that less VOC-releasing additives are contained in the reinforcing layer.

In one preferable embodiment, the coat weight of the reinforcing layer is of 80-300 gsm, e.g. 100-200 gsm.

There also could be an optional surface treatment on the reinforcing layer for less coefficient of friction and better heat resistance.

The total coating weight of substrate is more than 50 gsm, preferably 100 gsm-300 gsm.

When the substrate is airbag, the total weight of the adhesive layer and reinforcing layer is of 90-300 gsm, among which the adhesive layer is of 10 gsm-80 gsm, optional 20-50 gsm; and the second layer is of 80 gsm-200 gsm, optional 100 gsm-180 gsm.

When the substrate is artificial leather, the total weight of the adhesive layer and reinforcing layer is of 200-400 gsm, among which first layer is of 50 gsm-200 gsm, optional 80-120 gsm; and the second layer is of 100 gsm-300 gsm.

In one preferable embodiment of the disclosure, the adhesive layer is directly arranged between the substrate and the reinforcing layer. In another preferable embodiment, the composite sheet is composed of the substrate, the silicone adhesive layer and the reinforcing layer as defined above, wherein the adhesive promotors, preferably those releasing VOC, are contained only in the silicone adhesive layer.

Depending on the various applications, the composition of either silicone adhesive layer or reinforcing layer may further comprise component E), other additives that do not release VOC. These additives are known to the skilled person.

In one embodiment, the composition of the silicone composition of adhesive layer or reinforcing layer may contain a non-VOC-releasing filler material such as a reinforcing filler or a non-reinforcing filler, preferably a non-reinforcing mineral filler. Such filler materials may include, but not be limited to, various amorphous or crystalline inorganic compounds, such as fumed silica, precipitated silica, quartz, wollastonite, glass bead, talc, Kaolin, Mica or calcium carbonate etc.; and metal oxides such as alumina, hydrated alumina, ferric oxide and titanium dioxide; or mixtures thereof.

The amount of these non-VOC-releasing additives, in particular filler material such as the fibrous materials added to the silicone composition may e.g. range from 5 to 40 parts, prefer 10 to 35 parts by weight per 100 parts by weight of the organopolysiloxane.

In another aspect of the disclosure, it relates to a method for coating, comprising the following steps:
providing a substrate,
applying a silicone adhesive layer on the substrate, and applying a reinforcing layer on the adhesive layer;
wherein said substrate, adhesive layer and reinforcing layer are as defined above and the coating amount of the silicone adhesive layer is less than 45 wt %, preferably less than 35 wt %, more preferably less than 20 wt %, based on the total coating amount of the silicone adhesive layer and the reinforcing layer.

In one preferable embodiment of the inventive method, the adhesive layer is coated directly onto the substrate, preferably airbags and artificial leathers, and then after curing of the adhesive layer the reinforcing layer is coated directly onto the adhesive layer.

EXAMPLES

TVOC Test Equipment: HS-GC/FID
TVOC Test Condition:

Prior to weighing, these materials shall be cut into pieces and dried for 24 h over calcium chloride.

The specimen shall be removed at the indicated location from the material across the full cross section of the specimen. Then they shall be cut to pieces with a weight between 10 mg and 25 mg without increasing the temperature of the specimen.

The specimen parts are weighed in a head space vial (min. 3 vials per specimen). The vial is sealed gas-tight using a Teflon-coated septum facing the inside of the vial.

TVOC Testing Method:

Prior to measurement the vials are conditioned in the air above the sample for 5 hours±5 minutes at 120° C.±1° C. in the head space sampling valve in order to enrich the vial with the substances contained in the sample, immediately afterwards the vials shall be analyzed. At least 3 samples shall be analyzed.

The blank value is determined by calculating the mean value taking signal values from at least 3 measurements with empty vials.

Dosage shall be identical and reproducible for all sample analyses, blank value and calibrating solution.

The separating column shall be heated up to maximum temperature for at least 15 minutes once a week.

Adhesion Test Method:

Adhesion test is carried out according to the following steps:

Step 1: Coating first layer on 470 dtex nylon 66 fabric 46*46/cm with knife coater, coating weight 25 gsm-30 gsm, curing at 160° C.*2 min;

Step 2: Coating 1 mm thickness*5 mm length*1 cm width second layer between two pieces of first layer coated fabric, curing at 160° C.*2 min;

Step 3: Peel the cookies, record the maximum force and failure mode; Standard: 100% cohesion failure mold requested;

Step 4: aging the cookies at 70° C.*95% RH at 17 days;

Step 5: test the peeling, record the maximum force and failure mode.

Testing Sample Preparation:

Mix first part and second part evenly, knife coating or layer bar coating the first layer on the fabric with requested coat weight and cure for 160° C.*2 min (for airbag) or 110° C.*6 min (for artificial leather), then coat the second layer on top of the first layer, with requested coat weight and curing condition.

Example 1, 2 and Comparative Examples

Component A1:
mixture of MM$^{Vi}$Q resin (vinyl content 0.041%) and vinyl terminal-polydimethylsiloxane oil, vinyl content 0.003%, viscosity 60,000 mpas;

Component A2:
mixture of MD$^{Vi}$Q resin (vinyl content 0.028%) and vinyl terminal-polydimethylsiloxane oil, vinyl content 0.003%, viscosity 100,000 mpas;

Component B:
methyl terminal-polymethylhydrogensiloxane with SiH content of 0.69 mol/100 g;

Component C:
Bluestar Silicones Silcolease Catalyst 21093, Bluestar Silicones

Component D:
Mixture of 3-glycidoxypropyl trimethoxy silane and butyl titanate;

component E:
calcium carbonated

Example 1

Preparation for the second layer (reinforcing layer):
100 parts component A2, 7 parts component B by weight of per 100 parts component A2, 0.027 parts component C by weight of per 100 parts component A2, 18.9 parts component E by weight of per 100 parts component A2

Coat weight: 155 gsm
Curing condition: 160° C.*2 min

Preparation for the first layer (silicone adhesive layer):
100 parts component A2, 7 parts component B by weight of per 100 parts component A2, 2.8 parts component D by weight of per 100 parts component A2, 0.027 parts component C by weight of per 100 parts component A2, 18.9 parts component E by weight of per 100 parts component A2.

Substrate: 470 dtex nylon 66 fabric
Coat weight: 25 gsm
Curing condition: 160° C.*2 min Example 2

Preparation for the second layer (reinforcing layer):
100 parts component A1, 7 parts component B by weight of per 100 parts component A1, 0.022 parts component C by weight of per 100 parts component A1; 26 parts component E by weight of per 100 parts component A1.

Coat weight: 155 gsm
Curing condition: 160° C.*2 min

Preparation for the first layer (silicone adhesive layer):
100 parts component A2, 7 parts component B by weight of per 100 parts component A2, 2.8 parts adhesive promoter D by weight of per 100 parts component A2, 0.027 parts component C by weight of per 100 parts component A2, 18.9 parts component E by weight of per 100 parts component A2.

Substrate: 470 dtex nylon 66 fabric
Coat weight: 25 gsm
Curing condition: 160° C.*2 min Comparative Example 1

Preparation: 100 parts component A1, 7 parts component B by weight of per 100 parts component A1, 4.64 parts adhesive promoter D by weight of per 100 parts component A1, 0.022 parts component C by weight of per 100 parts component A1, 26 parts component E by weight of per 100 parts component A1, mixed as second part.

Substrate: 470 dtex nylon 66 fabric
Coat weight: 155 gsm
Curing condition: 160° C.*4 min Comparative Example 2

Preparation: 100 parts component A2, 7 parts component B by weight of per 100 parts component A2, 2.8 parts adhesive promoter D by weight of per 100 parts component A2, 0.027 parts component C by weight of per 100 parts component A2, 18.9 parts component E by weight of per 100 parts component A2, mixed as second part.

Substrate: 470 dtex nylon 66 fabric
Coat weight: 180 gsm
Curing condition: 160° C.*4 min

Comparative Example 3

Preparation: 100 parts component A2, 7 parts component B by weight of per 100 parts component A2, 2.8 parts adhesive promoter D by weight of per 100 parts component A2, 0.027 parts component C by weight of per 100 parts component A2, 18.9 parts component E by weight of per 100 parts component A2, mixed as second part.
Substrate: 470 dtex nylon 66 fabric
Coat weight: 200 gsm
Curing condition: 160° C.*4 min+200° C.*4 min

TABLE 1

Composition and curing condition for Example 1, 2 and comparative example 1, 2 and 3

| First layer | Ex 1 | Ex 2 | Comparative Ex 1 | Comparative Ex 2 | Comparative Ex 3 |
|---|---|---|---|---|---|
| A1 | — | — | 100 | — | — |
| A2 | 100 | 100 | — | 100 | 100 |
| B | 7 | 7 | 7 | 7 | 7 |
| C | 0.027 | 0.027 | 0.022 | 0.027 | 0.027 |
| E | 18.9 | 18.9 | 26 | 18.9 | 18.9 |
| D | 2.8 | 2.8 | 4.64 | 2.8 | 2.8 |
| Coat weight | 25 gsm | 25 gsm | 155 gsm | 180 gsm | 200 gsm |
| Curing condition | 160° C.*2 min | 160° C.*2 min | 160° C.*4 min | 160° C.*4 min | 160° C.*4 min + 200° C.*4 min |

| Second layer | Ex 1 | Ex 2 | Comparative Ex 1 | Comparative Ex 2 | Comparative Ex 3 |
|---|---|---|---|---|---|
| A1 | — | 100 | NA | NA | NA |
| A2 | 100 | — | | | |
| B | 7 | 7 | | | |
| C | 0.027 | 0.022 | | | |
| E | 18.9 | 26 | | | |
| D | — | — | | | |
| Coat weight | 155 gsm | 155 gsm | | | |
| Curing condition | 160° C.*2 min | 160° C.*2 min | | | |

TABLE 2

TVOC Test results for all examples:

| | Example 1 | Example 2 | Comparative Ex 1 | Comparative Ex 2 | Comparative Ex 3 |
|---|---|---|---|---|---|
| First Layer (gsm) | 25 gsm | 25 gsm | — | — | — |
| Second layer (gsm) | 155 gsm | 155 gsm | — | — | — |
| Total (gsm) | 180 gsm | 180 gsm | 155 gsm | 180 gsm | 200 gsm |
| TVOC (ugC/g) | 65.6 ugC/g | 30.0 ugC/g | 230.9 ugC/g | 158.3 ugC/g | 55.9 ugC/g |

TABLE 3

Adhesive test results for Example 2

Initial

| First layer coat weight (gsm) | Second layer thickness (mm) | Cohesive (%) |
|---|---|---|
| 24 gsm | 0.65 | 100% |
| 37 gsm | 0.7 | 100% |

TABLE 3-continued

Adhesive test results for Example 2

After 70° C. 95% 2 weeks aging

| Adhesive layer coat weight (gsm) | Second layer thickness (mm) | Cohesive (%) |
|---|---|---|
| 26 gsm | 0.8 | 100% |
| 37 gsm | 0.9 | 100% |

In all, as can be seen from the above results, the inventive composite sheet (two layers) have much lower TVOC release than the traditional signal layer structure (one layer). In the meantime, the cohesive strength is still maintained in a high level and has good stable adhesion.

According to the result, if the amount of first layer is more than 45% (based on the total coating amount of the silicone adhesive layer and the reinforcing layer), although the TVOC also could be reduced with longer curing time and/or higher curing temperature, this is difficult to realize and not practical in industry.

The invention claimed is:
1. A composite sheet, comprising:
1) A substrate layer selected from a fabric or a polymeric film,
2) a silicone adhesive layer coated onto the substrate layer and comprising one or more volatile organic compound (VOC) releasing additives, and
3) a reinforcing layer adjacent to the silicone adhesive layer;
wherein a coating amount of the silicone adhesive layer is less than 45 wt % based on total coating amount of the silicone adhesive layer and the reinforcing layer;
wherein both silicone adhesive layer and reinforcing layer comprise or consist essentially of liquid silicone rubber (LSR) or room temperature vulcanized silicone rubber (RTV);

wherein at least 60% of the total amount of VOC-releasing additives based on total coating amount of the silicone adhesive layer and the reinforcing layer are contained in the silicone adhesive layer;
wherein said reinforcing layer comprises one or more coatings comprising
　A) an organopolysiloxane having one or more silicon atom-bonded alkenyl groups on average in one molecule;
　B) an organohydrogenpolysiloxane; and
　C) a hydrosilylation reaction catalyst present in any amount effective to cure the composition, and
wherein the silicone adhesive layer comprises
　A) an organopolysiloxane having one or more silicon atom-bonded alkenyl groups on average in one molecule;
　B) an organohydrogenpolysiloxane;
　C) a hydrosilylation reaction catalyst present in any amount effective to cure the composition; and
　D) a VOC-releasing additive,
wherein said organopolysiloxane is an organopolysiloxane resin of formula $MD^{Vi}Q$ consisting essentially of the following units:
　divalent siloxane units M of formula $R_2SiO_{2/2}$;
　monovalent siloxane units $D^{Vi}$ of formula $R'R_2SiO_{1/2}$, and
　tetravalent siloxane units Q of formula $SiO_{4/2}$;
　wherein R represents a monovalent hydrocarbon group having from 1 to 20 carbon atoms, and R' represents an alkenyl group.

2. The composite sheet of claim 1, the substrate is a fabric selected from the group consisting of a woven fabric, a nonwoven fabric, and a polymeric film wherein the polymeric film is selected from the group consisting of polypropylene, polyethylene, fiberglass, polyamides, (poly)ethylene terephthalate, and compositions or mixtures thereof.

3. The composite sheet of claim 1, wherein total volatile organic content (TVOC) release thereof is less than 100 μgC/g.

4. The composite sheet as claimed in claim 1, wherein at least 70% of the total amount of VOC-releasing additives based on total coating amount of the silicone adhesive layer and the reinforcing layer are contained in the silicone adhesive layer.

5. The composite sheet of claim 1, wherein the VOC-releasing additives are adhesive promotors which are selected from the group consisting of a vinyl-based silane or organosiloxane, a partially hydrolyzed vinyl-based silane or organosiloxane, and a reaction product thereof, a silane or organsiloxane functionalized by an epoxy functional group, or partially hydrolyzed silane or organsiloxane functionalized by an epoxy functional group, and a reaction product thereof.

6. The composite sheet of claim 1, wherein the amount of the VOC-releasing additives is from 0.01 to 5 parts per 100 parts by weight of component A organopolysiloxane.

7. The composite sheet of claim 1, wherein the organopolysiloxane comprises at least two different siloxane units selected from the group consisting of siloxane units M of formula $R_3SiO_{1/2}$, siloxane units D of formula $R_2SiO_{2/2}$, siloxane units T of formula $RSiO_{3/2}$ and siloxane units Q of formula $SiO_{4/2}$,
　wherein R represents a monovalent hydrocarbon group having from 1 to 20 carbon atoms,
　and
　with the proviso that at least one of these siloxane units is the siloxane unit T or Q and at least one of the siloxane units M, D and T comprises an alkenyl group.

8. The composite sheet of claim 1, wherein the total coating weight of the adhesive layer and the reinforcing layer is more than 50 gsm.

9. The composite sheet of claim 1, wherein when the substrate is an airbag, the total weight of the adhesive layer and the reinforcing layer is 90 to 300 gsm,
　or wherein when the substrate is artificial leather, the total weight of the adhesive layer and the reinforcing layer is 200 to 400 gsm.

10. The composite sheet of claim 5, that comprises said substrate, said silicone adhesive layer and said reinforcing layer, wherein the adhesive promotors-are contained only in the silicone adhesive layer.

11. The composite sheet of claim 5, wherein the adhesive promotors are selected from the group consisting of epoxy silane, alkoxy silane, and aryloxy silane, and oligomers thereof.

12. The composite sheet of claim 11, wherein the adhesive promotors are selected from the group consisting of gamma-glycidoxypropyl trimethoxysilane, octyltriethoxysilane, vinyltriethoxysilane, vinyltrimethoxysilane, gamma-methacryloxy-propyltrimethoxysilane, beta-(3,4-epoxycyclohexyl)-ethyltrimethoxysilane, and beta-(3,4-epoxycyclohexyl)-ethyltriethoxysilane.

13. The composite sheet of claim 1, wherein R is a monovalent aliphatic or aromatic hydrocarbon group having from 1 to 12 carbon atoms.

14. The composite sheet of claim 13, wherein R' is vinyl or allyl.

15. An airbag or artificial leather comprising the composite sheet as defined in claim 1.

* * * * *